United States Patent
Wong et al.

(10) Patent No.: US 8,489,942 B1
(45) Date of Patent: Jul. 16, 2013

(54) MEMORY MANAGEMENT METHOD, AND MEMORY CONTROLLER AND MEMORY STORAGE DEVICE USING THE SAME

(75) Inventors: Kim-Hon Wong, Hsinchu County (TW); Ying-Chi Lin, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 0 days.

(21) Appl. No.: 13/567,102

(22) Filed: Aug. 6, 2012

(30) Foreign Application Priority Data

May 31, 2012 (TW) .............................. 101119551 A

(51) Int. Cl.
*G11C 29/00* (2006.01)
*G11C 11/34* (2006.01)
*G11C 16/04* (2006.01)
*G06F 13/00* (2006.01)
*G06F 13/28* (2006.01)

(52) U.S. Cl.
USPC ....................... 714/710; 711/103; 365/185.33

(58) Field of Classification Search
None
See application file for complete search history.

(56) References Cited

U.S. PATENT DOCUMENTS

| | | | |
|---|---|---|---|
| 8,001,317 B2 * | 8/2011 | Yeh et al. ...................... | 711/103 |
| 2009/0150597 A1 * | 6/2009 | Yang et al. ................... | 711/103 |
| 2009/0248961 A1 * | 10/2009 | Chu et al. ..................... | 711/103 |
| 2010/0302847 A1 * | 12/2010 | Komai et al. ............ | 365/185.03 |
| 2011/0022787 A1 * | 1/2011 | Yeh et al. ...................... | 711/103 |
| 2011/0191525 A1 * | 8/2011 | Hsu et al. ...................... | 711/103 |

* cited by examiner

*Primary Examiner* — Guerrier Merant
(74) *Attorney, Agent, or Firm* — Jianq Chyun IP Office

(57) ABSTRACT

A memory management method for a rewritable non-volatile memory module including a plurality of physical unit groups is provided, and each physical unit group includes first physical units. The method includes: grouping the physical unit groups into a first and second areas, setting the physical unit groups of the first area in a first program mode indicating that all physical units are programmable, and setting the physical unit groups of the second area in a second program mode indicating that only the first physical units are programmable. The method also includes: when a physical unit group in the first area is damaged, transforming a physical unit group from the first program mode to the second program mode and the physical unit group is unable to be set back in the first program mode. Accordingly, the lifespan of the rewritable non-volatile memory module is increased.

24 Claims, 13 Drawing Sheets

| Lower physical page | Middle physical page | Upper physical page |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

FIG. 3B 322  324  326  328

| Word line | Lower physical page | Middle physical page | Upper physical page |
|---|---|---|---|
| 0 | 1 | 3 | 6 |
| 1 | 2 | 5 | 9 |
| 2 | 4 | 8 | 12 |
| ⋮ | ⋮ | ⋮ | ⋮ |
| 85 | 253 | 256 | 258 |

FIG. 3C dable non-volatile memory module. The memory management circuit is coupled to the host interface and the memory interface. The memory management circuit groups the physical unit groups into at least a first area and a second area. Moreover, the memory management circuit sets the physical unit groups of the first area in a first program mode and sets the physical unit groups of the second area in a second program mode, where the first program mode indicates that all of the physical units are programmable, and the second program mode indicates that only the first physical unit is programmable. When a first physical unit group in the second area satisfies a second damage condition, the memory management circuit uses a second physical unit group of the

MEMORY MANAGEMENT METHOD, AND MEMORY CONTROLLER AND MEMORY STORAGE DEVICE USING THE SAME

CROSS-REFERENCE TO RELATED APPLICATION

This application claims the priority benefit of Taiwan application serial no. 101119551, filed on May 31, 2012. The entirety of the above-mentioned patent application is hereby incorporated by reference herein and made a part of this specification.

BACKGROUND

1. Technical Field

The invention relates to a memory management method. Particularly, the invention relates to a memory management method for a rewritable non-volatile memory module, a memory controller and a memory storage device using the same.

2. Related Art

Digital cameras, cell phones, and MP3 players have undergone rapid growth in recent years, so that consumer demands for storage media have also rapidly increased. Since a rewritable non-volatile memory module (for example, a flash memory) has characteristics such as data non-volatility, low power consumption, small volume, non-mechanical structure, etc., it is suitable for being built in the aforementioned various portable multimedia devices.

According to the number of bits stored in each memory cell, NAND flash memories are classified into single level cell (SLC) NAND flash memories, multi level cell (MLC) NAND flash memories and trinary level cell (TLC) NAND flash memories, where each memory cell of the SLC NAND flash memory can store one bit (i.e. "1" and "0"), each memory cell of the MLC NAND flash memory can store two bits, and each memory cell of the TLC NAND flash memory can store three bits.

Taking the TLC NAND flash memory as an example, each physical block includes a plurality of physical page sets, and each of the physical page sets includes a lower physical page, a middle physical page and an upper physical page. Generally, the physical blocks in the flash memory are grouped into a plurality of usage areas, and a replacement area also includes a plurality of the physical blocks. When a physical block in the usage area is damaged, the physical block in the replacement area can be used to replace the damaged physical block. However, when the replacement area has no available physical block, it represents that a usage lifespan of the flash memory is ended. Therefore, how to effectively manage the physical blocks to prolong the lifespan of the flash memory is an important issue to be studied by related practitioners.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory management method and a memory controller and a memory storage device using the same, which is capable of prolonging a usage lifespan of a rewritable non-volatile memory module.

An exemplary embodiment of the invention provides a memory management method, which is adapted to control a rewritable non-volatile memory module. The rewritable non-volatile memory module includes a plurality of physical unit groups, each of the physical unit groups includes a plurality of physical unit sets, each of the physical unit sets includes a plurality of physical units, and the physical units in each of the physical unit sets include a first physical unit. The method includes: grouping the physical unit groups into a first area and a second area, setting the physical unit groups of the first area in a first program mode and setting the physical unit groups of the second area in a second program mode, where the first program mode indicates that all of the physical units are programmable, and the second program mode indicates that only the first physical unit is programmable. The method also includes: when a first physical unit group in the second area satisfies a second damage condition, using a second physical unit group of the first area to replace the first physical unit group, and setting the second physical unit group in the second program mode, where the second physical unit group is unable to be set back in the first program mode.

According to another aspect, an exemplary embodiment of the invention provides a memory storage device including a connector, a rewritable non-volatile memory module and a memory controller. The connector is coupled to a host system. The rewritable non-volatile memory module includes a plurality of physical unit groups. Each of the physical unit groups includes a plurality of physical unit sets. Each of the physical unit sets includes a plurality of physical units, and the physical units in each of the physical unit sets include a first physical unit. The memory controller is coupled to the connector and the rewritable non-volatile memory module. The memory controller groups the physical unit groups into at least a first area and a second area. Moreover, the memory controller sets the physical unit groups of the first area in a first pro am mode and sets the physical unit groups of the second area in a second program mode, where the first program mode indicates that all of the physical units are programmable, and the second program mode indicates that only the first physical unit is programmable. When a first physical unit group in the second area satisfies a second damage condition, the memory controller uses a second physical unit group of the first area to replace the first physical unit group, and sets the second physical unit group in the second program mode, where the second physical unit group is unable to be set back in the first program mode.

According to another aspect, an exemplary embodiment of the invention provides a memory controller, which includes a host interface, a memory interface and a memory management circuit. The host interface is coupled to a host system. The memory interface is coupled to the aforementioned rewritable non-volatile memory module. The memory management circuit is coupled to the host interface and the memory interface. The memory management circuit groups the physical unit groups into at least a first area and a second area. Moreover, the memory management circuit sets the physical unit groups of the first area in a first program mode and sets the physical unit groups of the second area in a second program mode, where the first program mode indicates that all of the physical units are programmable, and the second program mode indicates that only the first physical unit is programmable. When a first physical unit group in the second area satisfies a second damage condition, the memory management circuit uses a second physical unit group of the first area to replace the first physical unit group, and sets the second physical unit group in the second program mode, where the second physical unit group is unable to be set back in the first program mode.

An exemplary embodiment of the invention provides a memory management method, which is adapted to control the aforementioned rewritable non-volatile memory module. The method includes: grouping the physical unit groups at least into a first area and a second area, setting the physical unit groups of the first area in a first program mode and setting the physical unit groups of the second area in a second program mode, where the first program mode indicates that all of the physical units are programmable, and the second program mode indicates that only the first physical unit is programmable. The method also includes: when at least one first physical unit group in the first area satisfies a first damage condition, grouping the at least one first physical unit group to the second area and setting the first physical unit group in the second program mode, where the at least one first physical unit group is unable to be set back in the first program mode.

According to the above descriptions, according to the memory management method, the memory controller and the memory storage device of the disclosure, the usage lifespan of the rewritable non-volatile memory is increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B are schematic diagrams of storage structure of a memory cell and a physical block according to the first exemplary embodiment of the invention.

FIG. 3C is a schematic diagram illustrating a writing sequence of physical pages according to an exemplary embodiment of the invention.

DETAILED DESCRIPTION OF DISCLOSED EMBODIMENTS

Figure 1A:
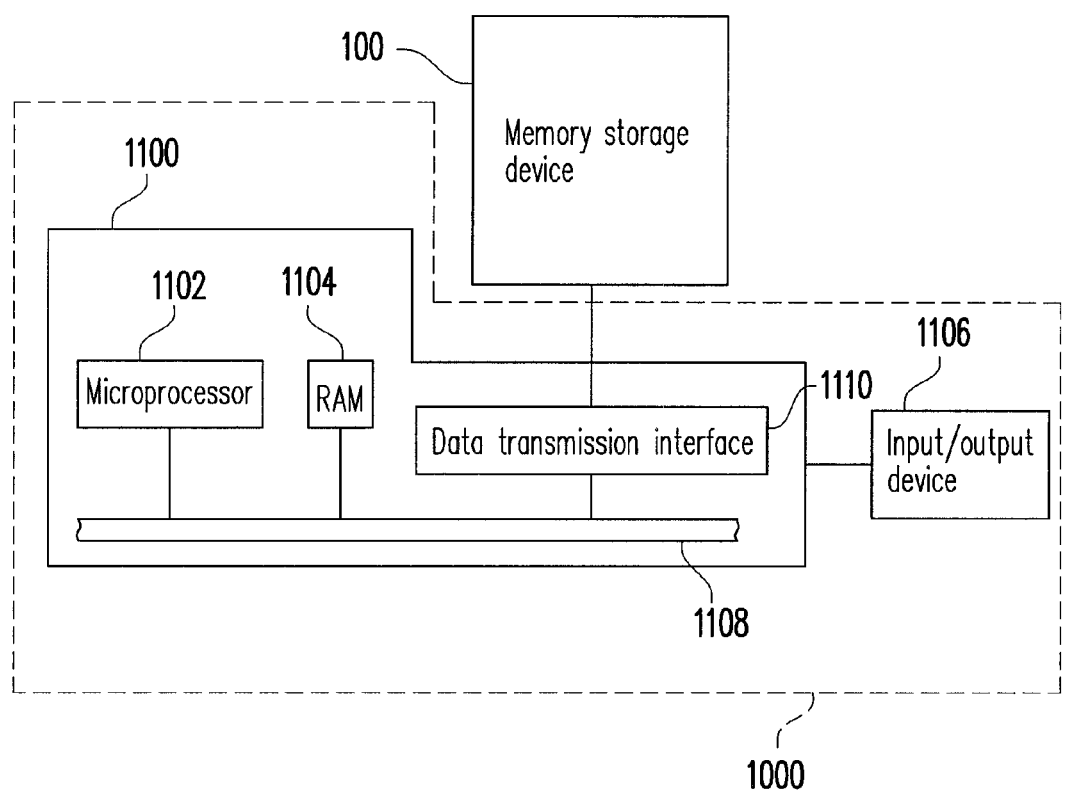
FIG. 1A is a schematic diagram of a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

In the present disclosure, a physical unit is also referred to as a physical page, a physical unit group is also referred to as a physical block, and a physical unit set is also referred to as a physical page set. The physical unit group is the smallest unit for erasing data. Moreover, a plurality of the physical unit groups mapped to a logical unit assembly is referred to a physical unit assembly. Moreover, an upper physical unit is also referred to as an upper physical page, a middle physical unit is referred to as a middle physical page, and a lower physical unit is referred to as a lower physical page. However, in other exemplary embodiments, the physical unit can be one or a plurality of electronic devices having characteristics of rewritable and non-volatile, for example, a physical sector, which is not limited by the invention. Moreover, a logical block is also referred to as a logical unit group, a logical page set is also referred to as a logical unit set, and a logical page is referred to as a logical unit. A plurality of logical unit groups can be referred to as a logical unit assembly.

Generally, a memory storage device (i.e. a memory storage system) includes a rewritable non-volatile memory module and a controller (i.e. a control circuit). Generally, the memory storage device is used together with a host system, so that the host system can write data into the memory storage device or read data from the memory storage device.

FIG. 1A is a schematic diagram of a host system and a memory storage device according to an exemplary embodiment of the invention.

Figure 1B:
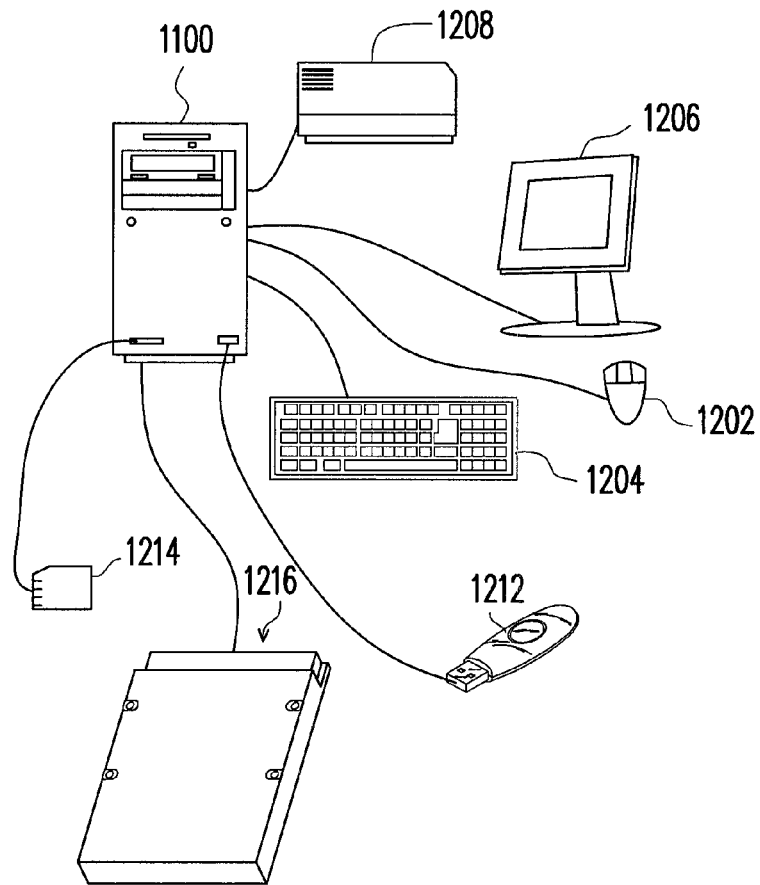
FIG. 1B is a schematic diagram of a computer, an input/output device and a memory storage device according to an exemplary embodiment of the invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may further include other devices.

In the present exemplary embodiment, the memory storage device 100 is coupled to the other components of the host system 1000 though the data transmission interface 1110. Based on operations of the microprocessor 1102, the RAM 1104 and the I/O device 1106, data can be written into the memory storage device 100 or read from the memory storage device 100. For example, the memory storage device 100 can be a rewritable non-volatile memory storage device such as a flash drive 1212, a memory card 1214 or a solid state drive (SSD) 1216, etc. shown in FIG. 1B.

Figure 1C:
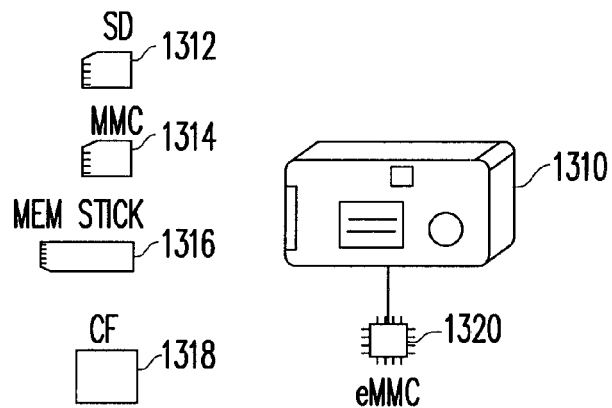
FIG. 1C is a schematic diagram of a host system and a memory storage device according to an exemplary embodiment of the invention.

Generally, the host system 1000 can be any system capable of substantially collaborating with the memory storage device 100 to store data. In the present exemplary embodiment, although a computer system is taken as the host system 1000 for descriptions, in another exemplary embodiment of the invention, the host system 1000 can also be a digital camera, a video camera, a communication device, an audio player or a video player, etc. For example, when the host system is a digital camera (video camera) 1310, the rewritable non-volatile memory storage device is a secure digital (SD) card 1312, a multi media card (MMC) 1314, a memory stick (MS) 1316, a compact flash (CF) card 1318 or an embedded storage device 1320 (shown in FIG. 1C) used by the digital camera (video camera) 1310. The embedded storage device 1320 includes an embedded MMC (eMMC). It should be noticed that the eMMC is directly coupled to a substrate of the host system.

Figure 2:
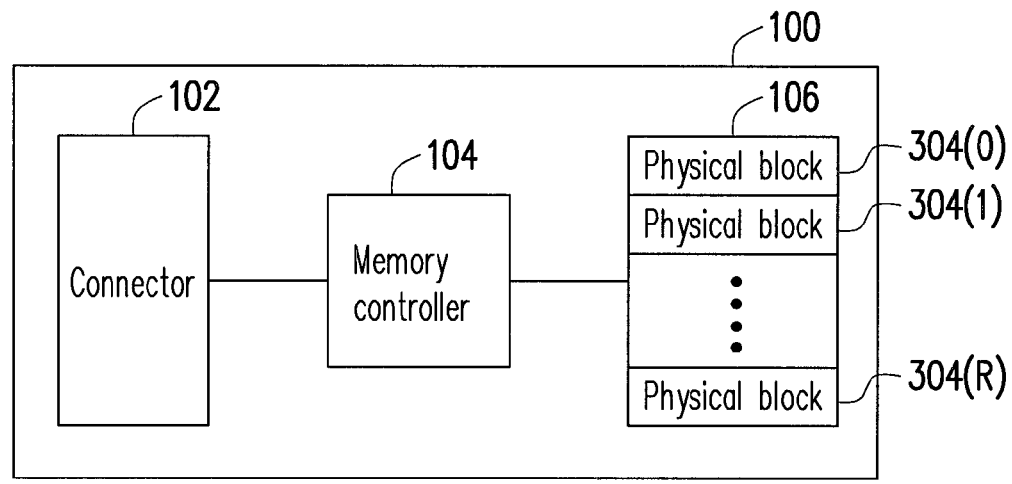
FIG. 2 is a schematic block diagram of the memory storage device of FIG. 1A.

FIG. 2 is a schematic block diagram of the memory storage device of FIG. 1A.

Referring to FIG. 2, the memory storage device 100 includes a connector 102, a memory controller 104 and a rewritable non-volatile memory module 106.

In the present exemplary embodiment, the connector 102 is complied with an SD interface standard. However, it should be noticed that the invention is not limited thereto, and the connector 102 can also be complied with a parallel advanced technology attachment (PATA) standard, an institute of electrical and electronic engineers (IEEE) 1394 standard, a peripheral component interconnect express (PCI express) standard, a universal serial bus (USB) standard, a serial advanced technology attachment (SATA) standard, an MS interface standard, an MMC interface standard, a CF interface standard, an integrated device electronics (IDE) standard or other suitable standards.

The memory controller 104 may execute a plurality of logic gates or control instructions implemented in a hardware form or a firmware form, and may perform a write operation, a read operation or an erase operation to the rewritable non-volatile memory module 106 according to commands from the host system 1000.

The rewritable non-volatile memory module 106 is coupled to the memory controller 104 for storing data written by the host system 1000. The rewritable non-volatile memory module 106 has physical blocks 304(0)-304(R). For example, the physical blocks 304(0)-304(R) may belong to a same memory die or belong to different memory dies. In the present exemplary embodiment, each of the physical blocks has a plurality of physical page sets, and each physical page set has at least one physical page formed by memory cells on a same word line, wherein the physical pages belonging to the same physical block must be simultaneously erased. In detail, the physical block is the smallest unit for erasing data. Namely, each physical block contains the least number of memory cells that are erased all together.

Figure 3A:
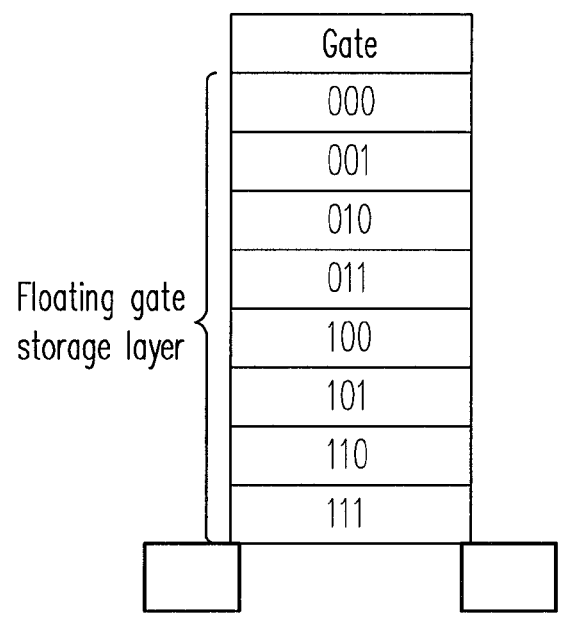

FIG. 3A and FIG. 3B are schematic diagrams of storage structure of a memory cell and a physical block according to the first exemplary embodiment of the invention.

Referring to FIG. 3A, a storage state of each memory cell of the rewritable non-volatile memory module 106 can be recognized as "111", "110", "101", "100", "011", "010", "001" or "000" (shown in FIG. 3A), in which a first bit counted from the left is a least significant bit (LSB), a second bit counted from the left is a center significant bit (CSB) and a third bit counted from the left is a most significant bit (MSB). Moreover, a plurality of memory cells arranged on a same word line may form 3 physical pages, where the physical page formed by the LSBs of the memory cells is referred to as a lower physical page, the physical page formed by the CSBs of the memory cells is referred to as a middle physical page, and the physical page formed by the MSBs of the memory cells is referred to as an upper physical page.

Referring to FIG. 3B, one physical block is composed of a plurality of physical page sets, where each of the physical page sets includes a lower physical page, a middle physical page and an upper physical page formed by a plurality of memory cells arranged on a same word line. For example, the digits in FIG. 3B represents an arranging sequence of the physical pages, and in the physical block, a $0^{th}$ physical page belonging to the lower physical page, a $1^{st}$ physical page belonging to the middle physical page and a $2^{nd}$ physical page belonging to the upper physical page are regarded as one physical page set. Similarly, the $3^{rd}$, $4^{th}$ and $5^{th}$ physical pages are regarded as one physical page set, and deduced by analogy, the other physical pages are also grouped into a plurality of physical page sets according to such method. Physical page is the smallest unit for programming data. Namely, physical page is the smallest unit for writing data. Particularly, when the memory cells arranged on the same word line are programmed, the read operation can be performed only after the lower physical page is programmed or after the lower physical page, the middle physical page and the upper physical page are programmed, or otherwise the stored data may be lost. For example, after the $0^{th}$ physical page and the $1^{st}$ physical page are programmed, the $2^{nd}$ physical page has to be programmed before reading the 0th-$2^{nd}$ physical pages.

FIG. 3C is a schematic diagram illustrating a writing sequence of the physical pages according to an exemplary embodiment of the invention.

Referring to FIG. 3C, in one physical block, the physical pages can be programmed in a serrated sequence. Each digit in a word line field 322 represents a referential number of a word line. Each digit in a lower physical page field 324, a middle physical page field 326 and an upper physical page field 328 represents a writing sequence of the physical page. For example, when data is programmed to the physical block, the memory controller 104 first programs the lower physical page of the $0^{th}$ word line. Then, the memory controller 104 programs the lower physical page of the $1^{st}$ word line and program the middle physical page of the $0^{th}$ word line. Then, the memory controller 104 programs the lower physical page of the $2^{nd}$ word line, the middle physical page of the $1^{st}$ word line and the upper physical page of the $0^{th}$ word line, and the others are deduced by analogy. In this way, the physical pages of different word lines can be simultaneously programmed. However, in other exemplary embodiments, the memory controller 104 may program one physical block according to different sequences, which is not limited by the invention.

Besides, when one physical block satisfies one of a plurality of damage conditions, such physical block is regarded as a damaged physical block. For example, the erase count of a physical block has an upper limit, and if the erase count of the physical block reaches the upper limit, the damage condition is satisfied. It is assumed that when it is selected to program the lower physical page, the middle physical page and the upper physical page, the upper limit of the erase count of the physical block is a first threshold value, and when it is selected to only program the lower physical page, the upper limit of the erase count of the physical block is a second threshold value. Particularly, the first threshold value is smaller than the second threshold value. For example, the first threshold value is 3000, and the second threshold value is 20000. The writing speed of the lower physical page is faster than the writing speed of the middle physical page and the upper physical page. Namely, when a batch of data is programmed to a physical block, a time required for programming the data to the lower physical page is shorter than a time required for programming the data to the middle physical page or the upper physical page. Moreover, if program fail is occurred when data is programmed to a physical block, the physical block having the program fail also satisfies a damage condition. Alternatively, when data is read from a physical block, if the number of error bits exceeds an upper limit that can be corrected by an error checking and correcting (ECC) code, such physical block also satisfies a damage condition. In overall, when a physical block satisfies one of the damage conditions, such physical block is regarded as a damaged physical block. However, the damage conditions are not limited by the invention.

On the other hand, when data is written into the physical blocks 304(0)-304(R), the data has to be written according to the arranging sequence of the physical pages. Moreover, the physical pages written with data have to be erased first for again writing data thereon. Generally, physical block is the smallest unit for managing the rewritable non-volatile memory module 106. For example, if data in only a part of the physical pages in one physical block is updated, valid data in the physical block has to be first moved to another empty physical block, and then the erase operation can be performed on such physical block. Here, moving of the valid data is referred to as a data merging operation. However, in another exemplary embodiment, physical page may also be used as the smallest unit for managing the rewritable non-volatile memory module 106, which is not limited by the invention.

Each of the physical pages generally includes a data bit area and a redundant bit area. The data bit area is used to store user data, and the redundant bit area is used to store system data (for example, the ECC code). In the present exemplary embodiment, each of the physical blocks is composed of 256 physical pages, and a volume of each physical page is 8 kilobyte (KB). However, it should be noticed that the invention is not limited thereto.

In the present exemplary embodiment, the rewritable non-volatile memory module 106 is a trinary level cell (TLC) NAND flash memory module, i.e. each of the physical page sets includes a lower physical page, a middle physical page and an upper physical page. However, it should be noticed that the rewritable non-volatile memory module 106 is not limited to be the TLC NAND flash memory module, and in another exemplary embodiment, the rewritable non-volatile memory module 106 may have multi level cells or may be other memory modules having the same characteristic.

Figure 4:
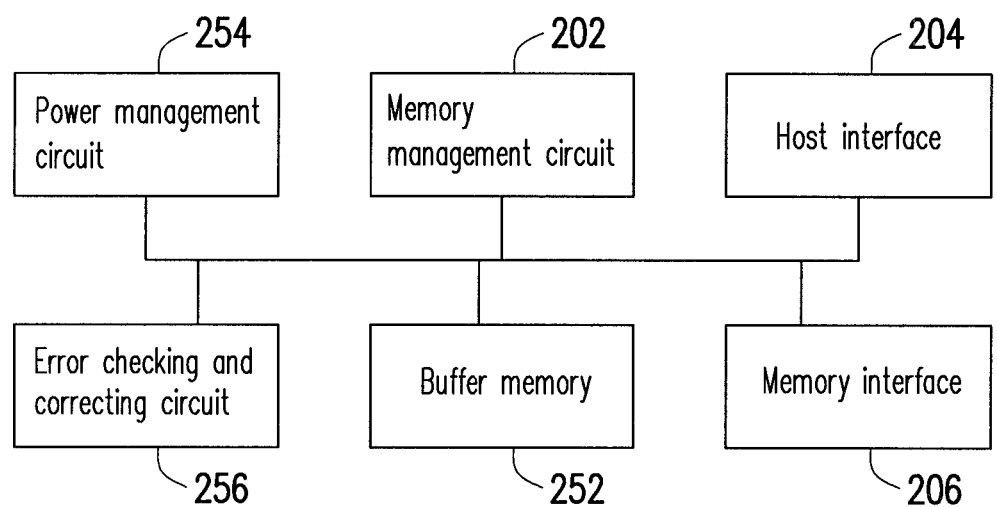
FIG. 4 is a schematic block diagram of a memory controller according to an exemplary embodiment of the invention.

FIG. 4 is a schematic block diagram of a memory controller according to an exemplary embodiment of the invention.

Referring to FIG. 4, the memory controller 104 includes a memory management circuit 202, a host interface 204 and a memory interface 206.

The memory management circuit 202 is used to control a whole operation of the memory controller 104. In detail, the memory management circuit 202 has a plurality of control commands, and when the memory storage device 100 operates, the control commands are executed to perform a write operation, a read operation and an erase operation, etc.

In the present exemplary embodiment, the control commands of the memory management circuit 202 are implemented in a firmware form. For example, the memory management circuit 202 has a microprocessor unit (not shown) and a read-only memory (not shown), and the control commands are burned into the read-only memory. When the memory storage device 100 operates, the control commands are executed by the microprocessor unit to perform a write operation, a read operation and an erase operation, etc.

In another exemplary embodiment of the invention, the control commands of the memory management circuit 202 may also be stored in a specific area (a system area in the memory module used for storing system data) of the rewritable non-volatile memory module 106 in form of program codes. Moreover, the memory management circuit 202 has a microprocessor unit (not shown), a read-only memory (not shown) and a random access memory (not shown). Particularly, the read-only memory has boot codes, and when the memory controller 104 is enabled, the microprocessor unit first executes the boot codes to load the control commands stored in the rewritable non-volatile memory module 106 to the random access memory of the memory management circuit 202. Then, the microprocessor unit executes the control commands to perform a write operation, a read operation and an erase operation, etc.

Moreover, in another exemplary embodiment of the invention, the control commands of the memory management circuit 202 may be implemented in a hardware form. For example, the memory management circuit 202 includes a micro controller, a memory management unit, a memory writing unit, a memory reading unit, a memory erasing unit and a data processing unit. The memory management unit, the memory writing unit, the memory reading unit, the memory erasing unit and the data processing unit are coupled to the micro controller. The memory management unit is configured to manage the physical blocks of the rewritable non-volatile memory module 106; the memory writing unit is configured to send a write command to the rewritable non-volatile memory module 106 to write data into the rewritable non-volatile memory module 106; the memory reading unit is configured to send a read command to the rewritable non-volatile memory module 106 to read data from the rewritable non-volatile memory module 106; the memory erasing unit is configured to send an erase command to the rewritable non-volatile memory module 106 to erase data in the rewritable non-volatile memory module 106; and the data processing unit is configured to process data to be written to the rewritable non-volatile memory module 106 or data to be read from the rewritable non-volatile memory module 106.

The host interface 204 is coupled to the memory management circuit 202 and is configured to receive and identify commands and data transmitted by the host system 1000. Namely, the commands and data transmitted by the host system 1000 are transmitted to the memory management circuit 202 through the host interface 204. In the present exemplary embodiment, the host interface 204 is complied with the SD standard. However, it should be noticed that the invention is not limited thereto, and the host interface 204 can also be complied with the PATA standard, the IEEE 1394 standard, the PCI express standard, the USB standard, the SATA standard, the MS standard, the MMC standard, the CF standard, the IDE standard or other suitable data transmission standard.

The memory interface 206 is coupled to the memory management circuit 202, and is configured to access the rewritable non-volatile memory module 106. Namely, data to be written into the rewritable non-volatile memory module 106 is transformed into a format that can be accepted by the rewritable non-volatile memory module 106 through the memory interface 206.

In an exemplary embodiment of the invention, the memory controller 104 further includes a buffer memory 252, a power management circuit 254 and an error checking and correcting (ECC) circuit 256.

The buffer memory 252 is coupled to the memory management circuit 202 and is configured to temporarily store data or commands from the host system 1000 or data from the rewritable non-volatile memory module 106.

The power management circuit 254 is coupled to the memory management circuit 202 and is configured to control the power of the memory storage device 100.

The ECC circuit 256 is coupled to the memory management circuit 202, and is configured to execute an ECC procedure to ensure correctness of data. In detail, when the memory management circuit 202 receives the write command from the host system 1000, the ECC circuit 256 generates a corresponding ECC code for data corresponding to the write command, and the memory management circuit 202 writes the data corresponding to the write command and the corresponding ECC code to the rewritable non-volatile memory module 106. Then, when the memory management circuit 202 reads data from the rewritable non-volatile memory module 106, it simultaneously reads the ECC code corresponding to the data, and the ECC circuit 256 performs the ECC procedure on the read data according to the ECC code.

Generally, the memory management circuit 202 groups the physical blocks 304(0)-304(R) into a system area, a data area, a replacement area and a spare area.

The physical blocks of the data area and the spare area are used to store data from the host system 1000. The physical blocks of the data area 402 are regarded as physical blocks already stored with data, and the physical blocks of the spare area are used for substituting the physical blocks of the data area. Therefore, the physical blocks of the spare area are empty or available physical blocks, i.e. physical blocks that are not stored with data or physical blocks stored with data marked to be invalid. Namely, the physical blocks in the spare area are already erased, or before the physical block in the spare area is selected to store data, an erase operation is first performed to the selected physical block.

The physical blocks logically belonging to the system area are used for recording system data, wherein the system data includes a manufacturer and a model number of the memory chip, the number of the physical blocks of the rewritable non-volatile memory module, and the number of physical pages in each physical block, etc.

The physical blocks logically belonging to the replacement area are replacement physical blocks. For example, when the rewritable non-volatile memory module is manufactured, 4% of the physical blocks therein are preserved for replacement. Namely, when the physical blocks in the data area, the spare area and the system area are damaged, the physical blocks preserved in the replacement area are used to replace the damaged physical blocks (i.e. bad blocks).

However, in the present exemplary embodiment, the memory management circuit 202 combines a conventional replacement area and the spare area into one area (which is also referred to as a third area) for utilization. Namely, when a physical block is damaged, a physical block is selected from the third area for replacement. When data is to be temporarily stored, a physical block is also selected from the third area for utilization.

Figure 5:
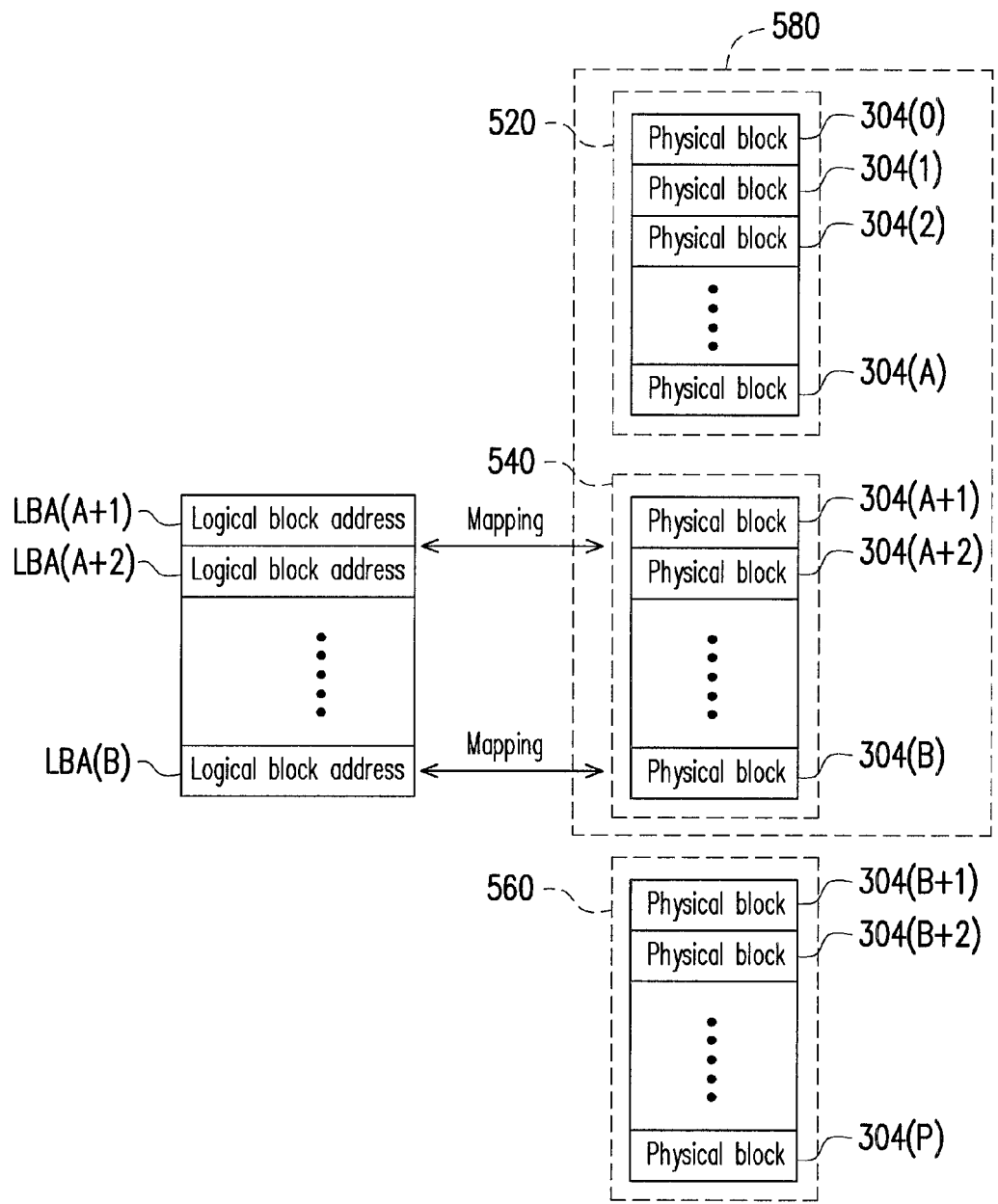
FIG. 5 is a schematic diagram illustrating an example of managing a rewritable non-volatile memory module according to an exemplary embodiment of the invention.

FIG. 5 is a schematic diagram illustrating an example of managing the rewritable non-volatile memory module according to an exemplary embodiment of the invention.

Referring to FIG. 5, the memory management circuit 202 groups the physical blocks 304(0)-304(R) into at least a first area 580 and a second area 560. Particularly, the memory management circuit 202 sets the physical blocks of the first area 580 in a first program mode and sets the physical blocks of the second area 560 in a second program mode, where the first program mode indicates that all of the lower physical pages, the middle physical pages and the upper physical pages are programmable, and the second program mode indicates that only the lower physical pages (which is also referred to as the first physical pages) are programmable. In other words, the memory management circuit 202 uses the lower physical pages, the middle physical pages and the upper physical pages of each of the physical blocks in the first area 580 to store data. In the second area 560, the memory management circuit 202 only uses the lower physical pages of each of the physical blocks to store data. The physical blocks of the first area 580 are used to provide a large storage space, though the upper limit (i.e. the first threshold value) of the erase count thereof is relatively small. The storage space of the physical blocks of the second area 560 is relatively small, though the upper limit (i.e. the second threshold value) of the erase count thereof is relatively large.

When a physical block of the first area 580 satisfies a first damage condition, such physical block is regarded as the damaged physical block. For example, the first damage condition includes: the erase count reaches the first threshold value, a program fail is occurred, or the number of error bits in the physical block exceeds an upper limit that can be corrected by the ECC code. When a physical block of the second area 560 satisfies a second damage condition, such physical block is regarded as the damaged physical block. For example, the second damage condition includes: the erase count reaches the second threshold value, a program fail is occurred, or the number of error bits in the physical block exceeds an upper limit that can be corrected by the ECC code.

For example, the memory management circuit 202 further divides the first area 580 into a third area 520 and a data area 540. The third area 520 includes physical blocks 304(0)-304(A), and the data area 540 includes physical blocks 304(A+1)-304(B), and the second area 560 includes physical blocks 304(B+1)-304(P). However, in other exemplary embodiments, the memory management circuit 202 may further group a system area from the physical blocks 304(0)-304(R), and the number of the grouped areas are not limited by the invention.

In the present exemplary embodiment, the memory management circuit 202 configures logical block addresses LBA (A+1)-LBA(B) for mapping to the physical blocks 304(A+1)-304(B) of the data area 540. Moreover, the memory management circuit 202 establishes a logical block address-physical block mapping table to record a mapping relationship of the logical block addresses LBA(A+1)-LBA(B) and the physical blocks 304(A+1)-304(B). The memory management circuit 202 further provides the logical block addresses LBA(A+1)-LBA(B) to the host system 1000. In this way, the host system 1000 can access the logical block addresses LBA(A+1)-LBA(B).

The physical blocks of the third area 520 can be used to replace the damaged physical blocks of the data area 540 or the second area 560. In the present exemplary embodiment, when the third area 520 has no available physical block, the memory management circuit 202 announces that the whole memory storage device 100 enters a write protect state, and data cannot be written therein.

Figure 6:
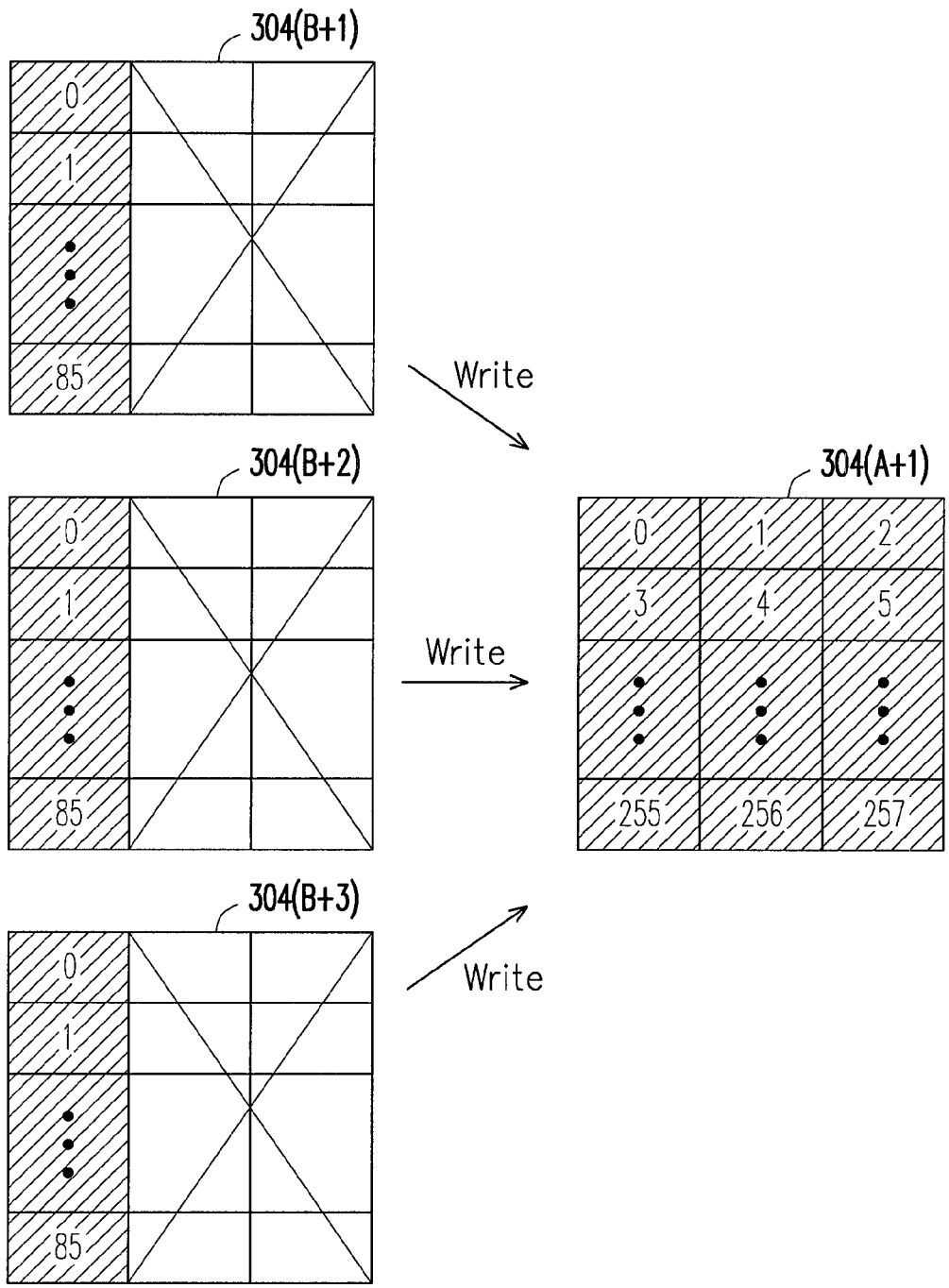
FIG. 6 is a schematic diagram illustrating an example of writing data into physical blocks of a second area according to another exemplary embodiment of the invention.

FIG. 6 is a schematic diagram illustrating an example of writing data into the physical blocks of the second area according to another exemplary embodiment of the invention.

Referring to FIG. 6, when a physical block is transformed from the first program mode to the second program mode, the memory management circuit 202 sends a command to the rewritable non-volatile memory module 106, so that the physical block set in the second program mode only provides the lower physical pages for writing data. Namely, the memory management circuit 202 can only obtains physical addresses of the lower physical pages of the physical block. For example, after the physical blocks 304(B+1)-304(B+3) are transformed to the second program mode, the physical blocks 304(B+1)-304(B+3) can only provide physical addresses 0-85 of the lower physical pages to the memory management circuit 202. After the host system 1000 receives a write command, the memory management circuit 202 first writes data to the lower physical pages of the physical blocks 304(B+1)-304(B+3). Then, the memory management circuit 202 duplicates the data from the lower physical pages of the physical blocks 304(B+1)-304(B+3) to the physical block 304(A+1).

When a physical block of the first area 580 satisfies the first damage condition, the memory management circuit 202 sets such physical block in the second program mode and groups it to the second area 560. Moreover, the memory management circuit 202 sets that such physical block cannot be again set in the first program mode.

Figure 7:
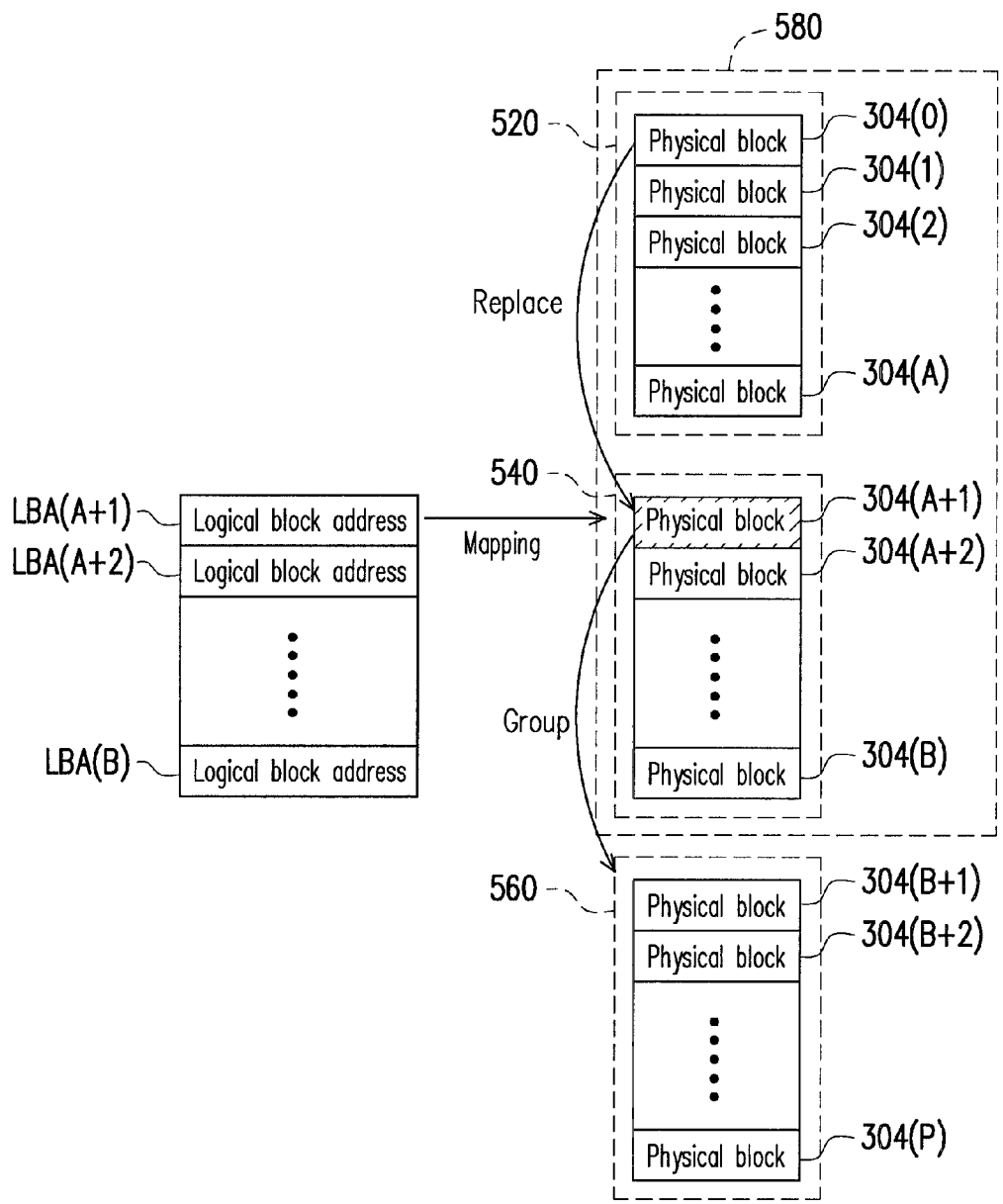
FIG. 7 is a schematic diagram illustrating an example of using a physical block of a third area to replace a physical block of the data area according to an exemplary embodiment of the invention.

FIG. 7 is a schematic diagram illustrating an example of using a physical block of the third area to replace a physical block of the data area according to an exemplary embodiment of the invention.

Referring to FIG. 7, when the physical block 304(A+1) of the data area 540 (which is also referred to as a first physical block) satisfies the first damage condition, it represents that the physical block 304(A+1) cannot use the lower physical pages, the middle physical pages and the upper physical pages therein to write data. The memory management circuit 202 determines the physical block 304(A+1) to be a damaged physical block, and uses a physical block of the third area 520 to replace the physical block 304(A+1). For example, the memory management circuit 202 gets the physical block 304(0) of the third area 520 to replace the physical block 304(A+1). It is assumed that the physical block 304(A+1) originally maps to the logical block address LBA(A+1). Therefore, when getting the physical block 304(0) to replace the physical block 304(A+1), the memory management circuit 202 remaps the logical block address LBA(A+1) to the physical block 304(0). Moreover, the memory management circuit 202 duplicates valid data in the physical block 304(A+1) to the physical block 304(0). Moreover, the memory management circuit 202 groups the physical block 304(A+1) to the second area 560, and transforms the physical block 304(A+1) from the first program mode to the second program mode. Particularly, after the physical block 304(A+1) is transformed to the second program mode, it cannot be transformed back to the first program mode. Since when only the lower physical page is used to write data, the upper limit of the erase count of the physical block is increased (from the first threshold value to the second threshold value), the physical block 304(A+1) can still be used after being set in the second program mode.

In an exemplary embodiment, the memory management circuit 202 can also first collect three damaged physical blocks in the first area 580, and then simultaneously groups the three physical blocks to the second area 560. However, the memory management circuit 202 can also simultaneously groups more or less number of the physical blocks to the second area 560, which is not limited by the invention.

However, when the third area 520 has no available physical block, the memory management circuit 202 can also get three physical blocks belonging to the second program mode from the second area 560 for grouping to the third area 520. These three physical blocks can be used to replace one physical block of the third area 520. In detail, the memory management circuit 202 uses the lower physical pages of the three physical blocks as lower physical pages, middle physical pages and upper physical pages of one physical block. In other words, when the third area 520 has no available physical block, the memory management circuit 202 gets the physical blocks of the second area 560 to avoid announcing the write protect state of the whole memory storage device 100, so as to prolong its usage lifespan.

Figure 8:
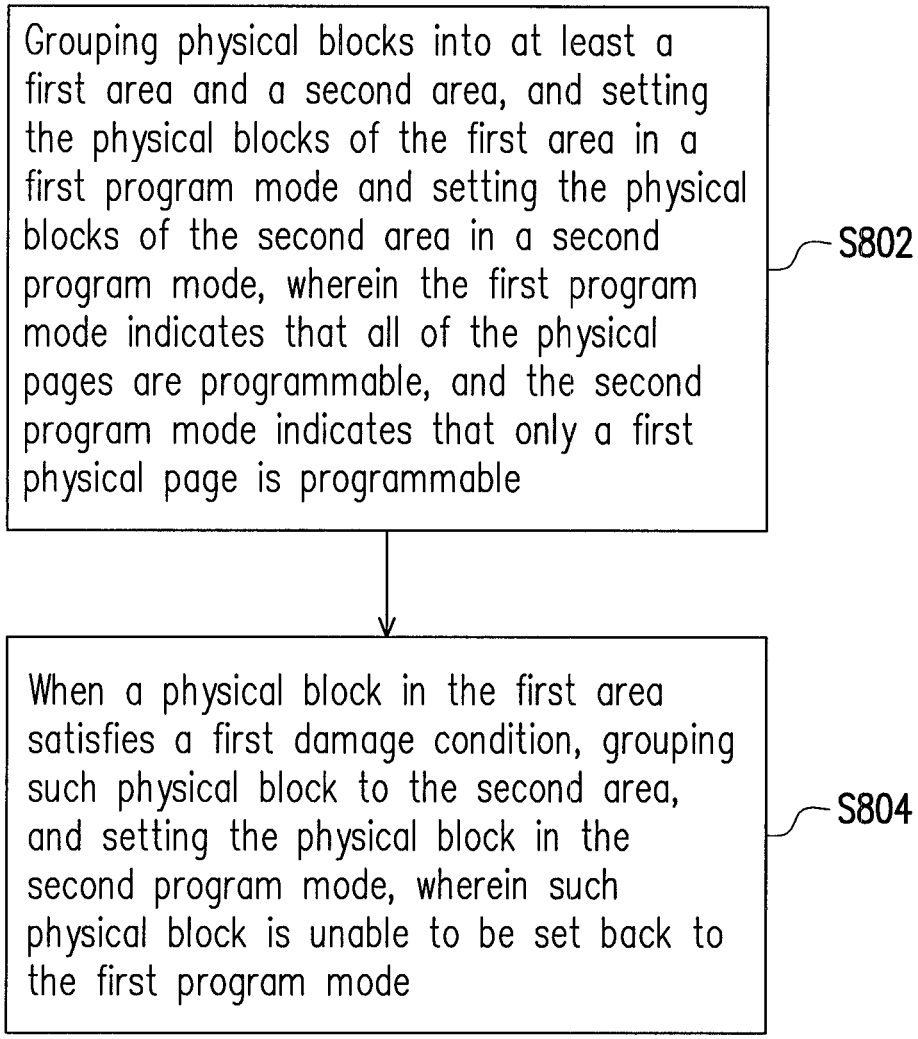
FIG. 8 is a flowchart illustrating a memory management method according to an exemplary embodiment of the invention.

FIG. 8 is a flowchart illustrating a memory management method according to an exemplary embodiment of the invention.

Referring to FIG. 8, in step S802, the memory management circuit 202 groups physical blocks into at least a first area and a second area, and sets the physical blocks of the first area in a first program mode and sets the physical blocks of the second area in a second program mode, where the first program mode indicates that all of the physical pages are programmable, and the second program mode indicates that only a first physical page is programmable.

In step S804, when a physical block in the first area satisfies a first damage condition, the memory management circuit 202 groups such physical block to the second area, and sets the physical block in the second program mode, where such physical block is unable to be set back in the first program mode. The first damage condition includes: the erase count of the physical block reaches the first threshold value, a program fail is occurred, or the number of error bits in the physical block exceeds an upper limit that can be corrected by the ECC code.

The steps of FIG. 8 have been described in detail above, and are not repeated herein.

Second Exemplary Embodiment

In the first exemplary embodiment, when a physical block in the first area is damaged, the memory management circuit 202 transforms the damaged physical block to the second program mode, and groups it to the second area. However, in the second exemplary embodiment, when a physical block of the second area is damaged, the memory management circuit 202 selects a physical block from the first area, and groups the selected physical block to the second area and sets it in the second program mode. Moreover, in the first exemplary embodiment, the memory management circuit 202 manages the rewritable non-volatile memory module 106 in a unit of physical block, though in the second exemplary embodiment, the memory management circuit 202 manages the rewritable non-volatile memory module 106 in a unit of physical page.

However, in the second exemplary embodiment, the memory management circuit 202 can also manage the rewritable non-volatile memory module 106 in the unit of physical block, which is not limited by the invention.

Figure 9:
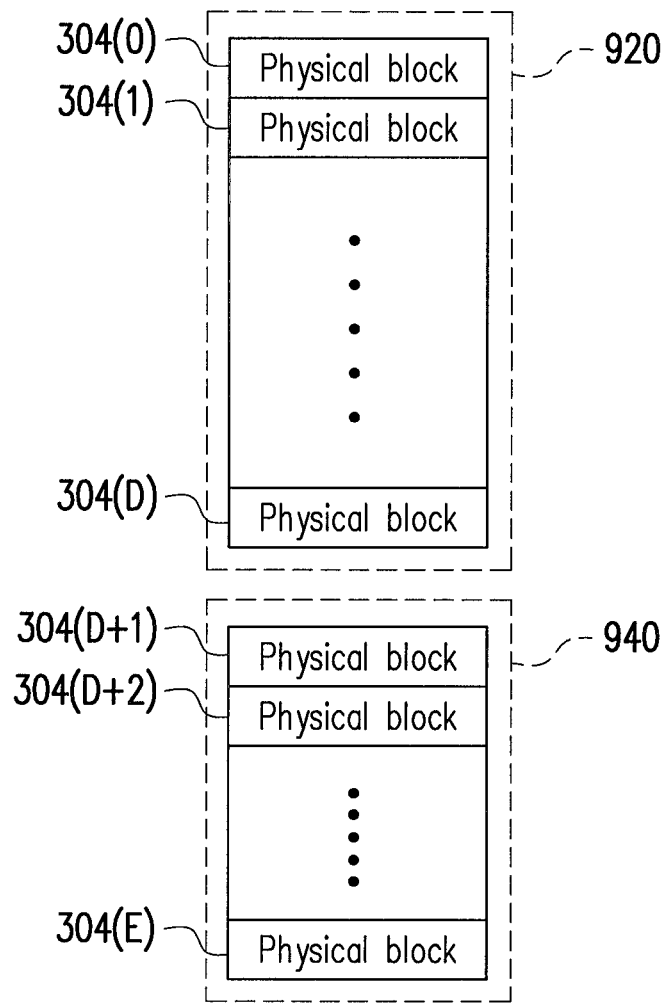
FIG. 9 is a schematic diagram illustrating an example of grouping physical blocks into a first area and a second area according to an exemplary embodiment of the invention.

FIG. 9 is a schematic diagram illustrating an example of grouping the physical blocks into a first area and a second area according to an exemplary embodiment of the invention.

Referring to FIG. 9, the memory management circuit 202 groups the physical blocks 304(0)-304(R) into a first area 920 and a second area 940. The first area 920 includes the physical blocks 304(0)-304(D), and the second area 940 includes the physical blocks 304(D+1)-304(E). The physical blocks 304(0)-304(D) are set in the first program mode, and the physical blocks 304(D+1)-304(E) are set in the second program mode.

When the memory management circuit 202 receives a write command and write data from the host system 1000, the memory management circuit 202 writes the write data into the physical blocks of the second area 940. Then, the memory management circuit 202 duplicates the write data from the second area 940 to the first area 920. Namely, the physical blocks of the second area 940 are used for temporary storage, and the physical blocks of the first area 920 can provide a large storage space.

Figure 10:
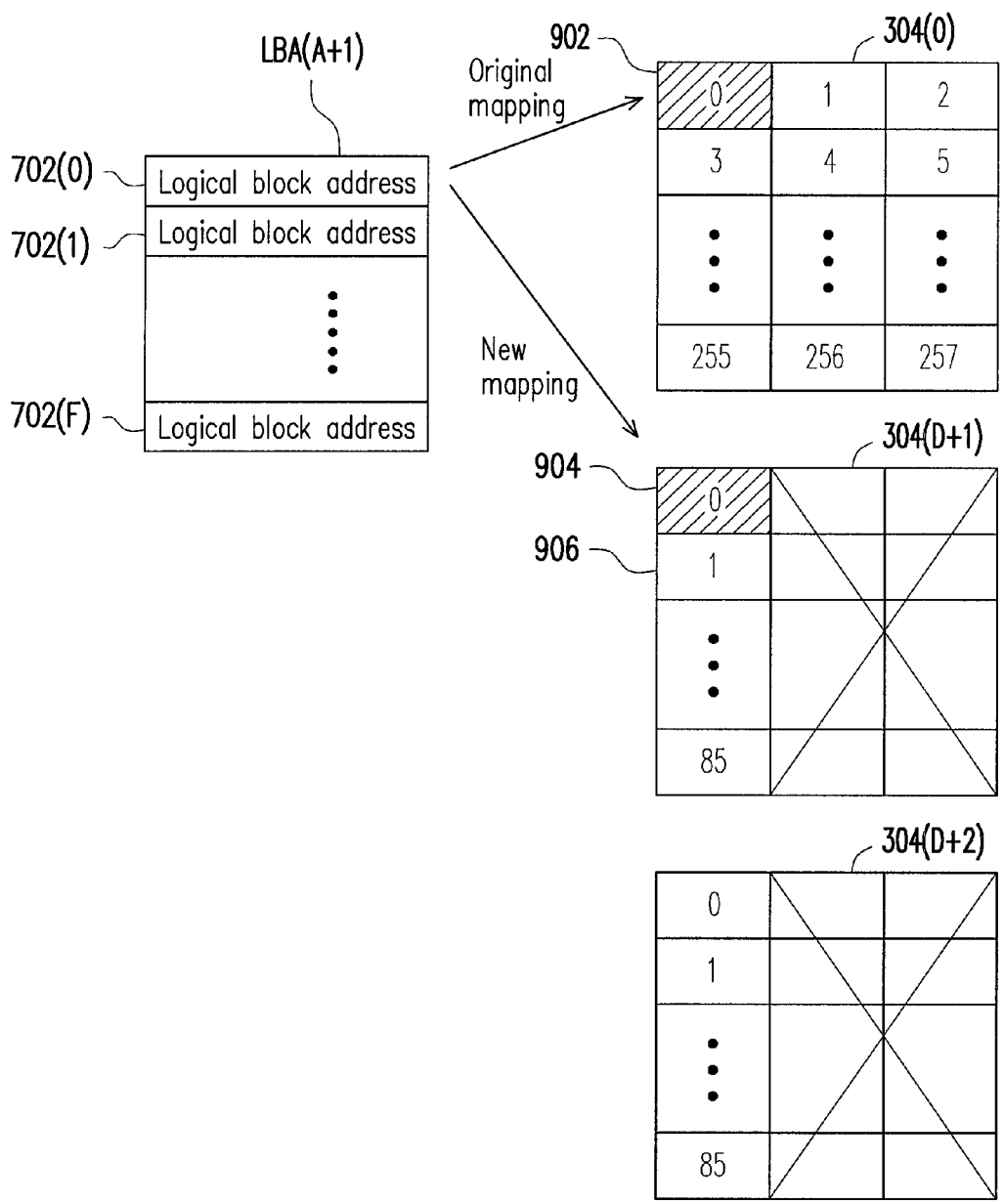
FIG. 10 is a schematic diagram illustrating an example of writing data in a unit of physical page according to an exemplary embodiment of the invention.

FIG. 10 is a schematic diagram illustrating an example of writing data in a unit of physical page according to an exemplary embodiment of the invention.

Referring to FIG. 10, the logical block address LBA(A+1) includes logical page addresses 702(0)-702(F), and the logical page address 702(0) is mapped to a lower physical page 902 of the physical block 304(0). When the host system 1000 is to update data in the physical page 902, it sends a write command and write data to the memory management circuit 202 for accessing the logical page address 702(0). The memory management circuit 202 writes the write data to a lower physical page 904 of the physical block 304(D+1). Then, the memory management circuit 202 marks the physical page 902 as invalid, and re-maps the logical page address 702(0) to the physical page 904. If the host system 1000 further sends a write command and write data for accessing the logical page address 702(0), the memory management circuit 202 writes the write data to a physical page 906 and marks the physical page 904 as invalid, and re-maps the logical page address 702(0) to the physical page 906. After the above operations, data stored in the physical pages 902 and 904 are invalid data, and data stored in the physical page 906 is valid data. When the physical block 304(D+1) has no available physical page, the memory management circuit 202 can use the physical pages in the physical block 304(D+2) to store data. When the size of the valid data in the physical blocks 304(D+1), 304 (D+2) and other physical blocks is conformed with the size of a physical block (for example, the physical block 304(0)) of the first area, the memory management circuit 202 duplicates the valid data back to the physical block of the first area. Moreover, the memory management circuit 202 sends an erase command to erase the physical blocks 304(D+1) and 304(D+2) to facilitate storing other write data from the host system 1000.

In the second exemplary embodiment, when a physical block of the first area 920 satisfies the first damage condition, the memory management circuit 202 duplicates valid data in the physical block to the other physical block in the first area 920, and marks such physical block as a damaged physical block. In other words, the first area 920 includes a plurality of physical blocks satisfying the first damage condition, and these physical blocks cannot store data under the first program mode. Particularly, these physical blocks are set in the second program mode for replacing the lower physical pages, the middle physical pages and the upper physical pages of one physical block in the first area 920. For example, when the memory management circuit 202 duplicates valid data from the second area 940 to the first area 920, if the first area 920 has no physical block capable of storing data under the first program mode, the memory management circuit 202 sets three physical blocks satisfying the first damage condition in the second program mode, and uses the lower physical pages of the three physical blocks to store valid data. Alternatively, when a physical block of the first area is damaged, the memory management circuit 202 sets three physical blocks in the second program mode, and uses these physical blocks to replace the damaged physical block.

Figure 11:
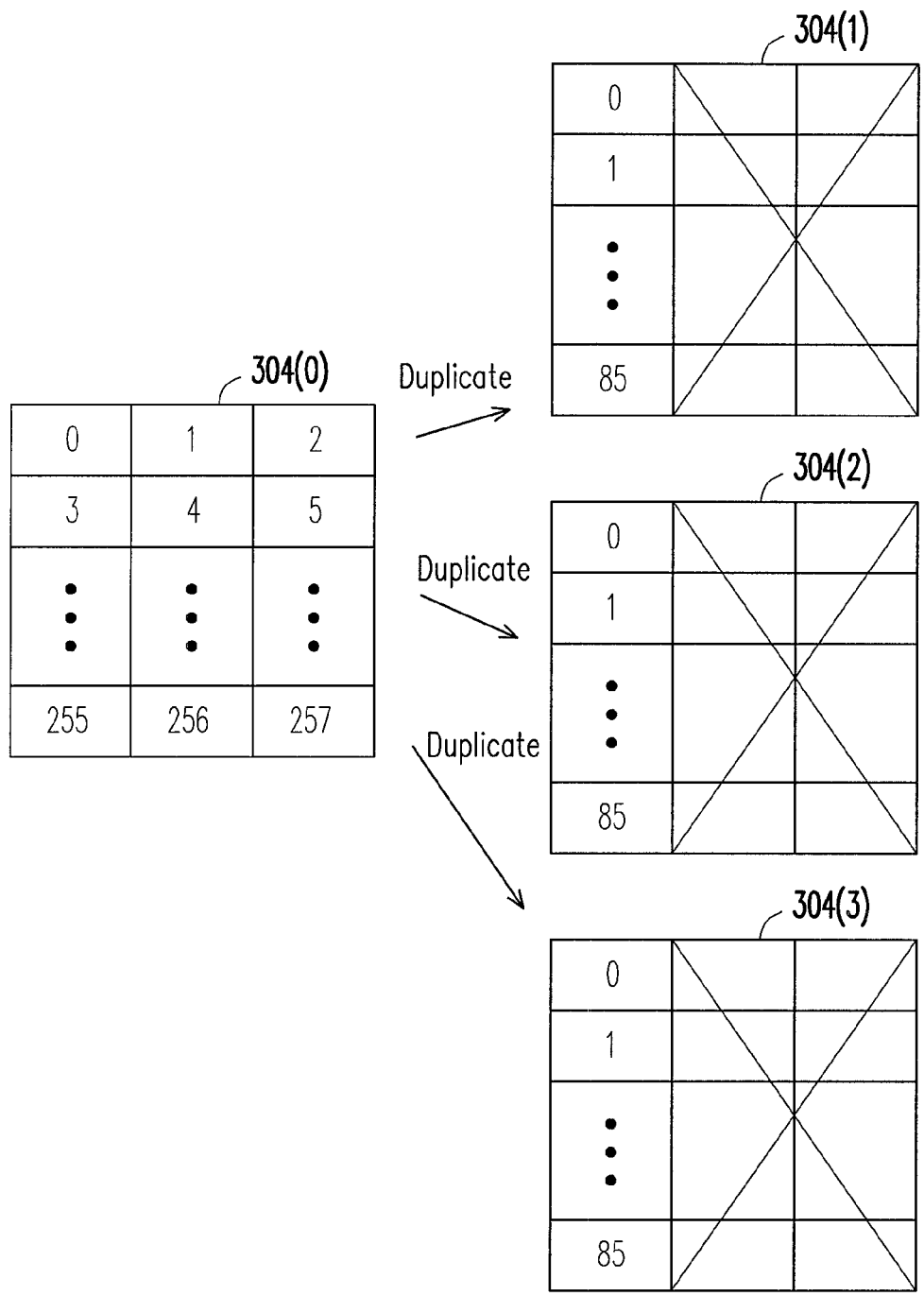
FIG. 11 is a schematic diagram illustrating an example of duplicating valid data in one physical block to three physical blocks set in a second program mode according to an exemplary embodiment of the invention.

FIG. 11 is a schematic diagram illustrating an example of duplicating valid data in one physical block to three physical blocks set in the second program mode according to an exemplary embodiment of the invention.

Referring to FIG. 11, when the physical block 304(0) (which is also referred to as a third physical block) satisfies the damage condition, the memory management circuit 202 gets physical blocks 304(1)-304(3) (which are also referred to as fourth physical blocks) satisfying the first damage condition. The memory management circuit 202 sets the physical blocks 304(1)-304(3) in the second program mode, and uses the physical blocks 304(1)-304(3) to replace the physical block 304(0). In detail, each of the logical block addresses LBA(A+1)-LBA(B) includes a plurality of logical page addresses, where at least one of the logical page addresses (which is also referred to as a third logical page address) is mapped to the physical page (which is also referred to as a third physical page) in the physical block 304(0) that stores the valid data. The memory management circuit 202 duplicates the valid data in the third physical page to at least one physical page (which is also referred to as a fourth physical page) in the physical blocks 304(1)-304(3). Moreover, the memory management circuit 202 re-maps the third logical page address originally mapped to the physical block 304(0) to the fourth physical page in the physical blocks 304(1)-304 (3).

In the exemplary embodiment FIG. 11, the memory management circuit 202 sets the physical blocks 304(1)-304(3) satisfying the first damage condition in the second program mode when the first area 920 has no physical block capable of storing data under the first program mode. However, in other exemplary embodiments, the memory management circuit 202 may set three physical blocks of the first area 920 that satisfies the first damage condition in the second program mode for further usage at other time points, which is not limited by the invention. Moreover, in another exemplary embodiment, when one physical page set includes four physical pages, the memory management circuit 202 can also use four physical blocks set in the second program mode to replace one physical block, and when two physical pages of the physical block set in the second program mode can be programmed, the memory management circuit 202 uses two physical blocks set in the second program mode to replace one physical block, which is not limited by the invention.

On the other hand, when the physical block (which is also referred to as a first physical block) of the second area 940 satisfies the second damage condition, the memory management circuit 202 selects a physical block (which is also refered to as a second physical block) from the first area 920 to replace the first physical block. For example, the memory management circuit 202 selects the physical blocks satisfying the first damage condition in priority from the first area 920 to serve as the physical blocks for replacement. However, the memory management circuit 202 may select the physical blocks with erase count between zero and the first threshold value from the first area 920 to serve as the physical blocks for replacement, which is not limited by the invention. It should be noticed that after the second physical block is grouped to the second area 940, the memory management circuit 202 sets the second physical block in the second program mode, and the second physical block cannot be set back in the first program mode.

Figure 12:
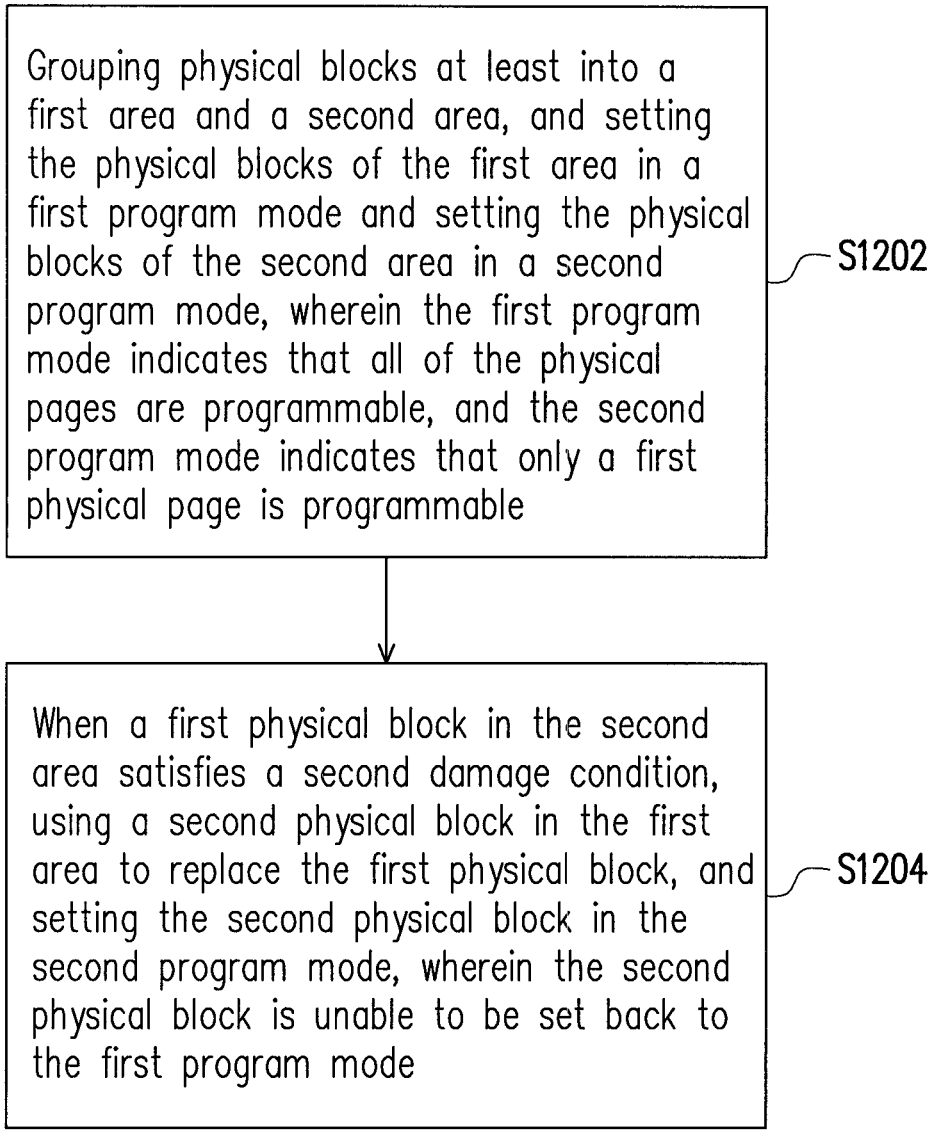
FIG. 12 is a flowchart illustrating a memory management method according to an exemplary embodiment of the invention.

FIG. 12 is a flowchart illustrating a memory management method according to an exemplary embodiment of the invention.

Referring to FIG. 12, in step S1202, the memory management circuit 202 groups physical blocks into at least a first area and a second area. Moreover, the memory management circuit 202 sets the physical blocks of the first area in a first program mode and sets the physical blocks of the second area in a second program mode, where the first program mode indicates that all of the physical pages are programmable, and the second program mode indicates that only a first physical page is programmable.

In step S1204, when a first physical block in the second area satisfies a second damage condition, the memory management circuit 202 uses a second physical block in the first area to replace the first physical block. The memory management circuit 202 sets the second physical block in the second program mode, and the second physical block cannot be set back in the first program mode, where the second damage condition includes: the erase count of the first physical block reaches the second threshold value, the first physical block occurs a program fail, or the number of error bits in the first physical block exceeds an upper limit that can be corrected by the ECC code.

The steps of FIG. 12 have been described in detail above, and are not repeated herein.

In summary, the exemplary embodiments of the invention provide a memory management method, a memory controller and a memory storage device. When the physical bock of the second area is damaged, the used physical block in the first area is used for replacement. Alternatively, when the physical block of the first area is damaged, the damaged physical block is set in the second program mode for further usage. In this way, a usage lifespan of the rewritable non-volatile memory is increased.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory management method, for a rewritable non-volatile memory module, wherein the rewritable non-volatile memory module comprises a plurality of physical unit groups, each of the physical unit groups comprises a plurality of physical unit sets, each of the physical unit sets comprises a plurality of physical units, and the physical units in each of the physical unit sets at least comprise a first physical unit, the memory management method comprising:

grouping the physical unit groups into at least a first area and a second area, setting the physical unit groups of the first area in a first program mode and setting the physical unit groups of the second area in a second program mode, wherein the first program mode indicates that all of the physical units are programmable, and the second program mode indicates that only the first physical unit is programmable; and when a first physical unit group in the second area satisfies a second damage condition, using a second physical unit group of the first area to replace the first physical unit group, and setting the second physical unit group in the second program mode, wherein the second physical unit group is unable to be set back in the first program mode.

2. The memory management method as claimed in claim 1, wherein the second damage condition comprises: an erase count of the first physical unit group reaches a second threshold value, the first physical unit group occurs a program fail, or the number of error bits in the first physical unit group exceeds an upper limit capable of being corrected by an error checking and correcting code.

3. The memory management method as claimed in claim 1, wherein the step of using the second physical unit group of the first area to replace the first physical unit group when the first physical unit group in the second area satisfies the second damage condition comprises:

obtaining the second physical unit group satisfying a first damage condition from the physical unit groups of the first area to replace the first physical unit group, wherein the first damage condition comprises: an erase count of the second physical unit group reaches a first threshold value, the second physical unit group occurs a program fail, or the number of error bits in the second physical unit group exceeds an upper limit capable of being corrected by an error checking and correcting code.

4. The memory management method as claimed in claim 1, wherein the step of using the second physical unit group of the first area to replace the first physical unit group when the first physical unit group in the second area satisfies the second damage condition comprises:

obtaining the second physical unit group with an erase count between zero and a first threshold value from the physical unit groups of the first area to replace the first physical unit group.

5. The memory management method as claimed in claim 1, further comprising:

when a third physical unit group of the first area satisfies a first damage condition, grouping the third physical unit group to the second area; and setting the third physical unit group in the second program mode, wherein the third physical unit group is unable to be set back in the first program mode, and the first damage condition comprises: an erase count of the third physical unit group reaches a first threshold value, the third physical unit group occurs a program fail, or the number of error bits in the third physical unit group exceeds an upper limit capable of being corrected by an error checking and correcting code.

6. The memory management method as claimed in claim 1, further comprising:

when a third physical unit group of the first area satisfies a first damage condition, obtaining a plurality of fourth physical unit groups in the first area that satisfy the first damage condition;

setting the fourth physical unit groups in the second program mode; and using the fourth physical unit groups to replace the third physical unit group, wherein the first damage condition comprises: an erase count of the fourth physical unit groups reaches a first threshold value, the fourth physical unit groups occur a program fail, or the number of error bits in the fourth physical unit groups exceeds an upper limit capable of being corrected by an error checking and correcting code.

7. The memory management method as claimed in claim 6, wherein the step of obtaining the fourth physical unit groups in the first area that satisfy the first damage condition when the third physical unit group of the first area satisfies the first damage condition comprises:

determining whether the first area has a physical unit group that is capable of storing data under the first program mode, and if not, obtaining the fourth physical unit groups to replace the third physical unit group.

8. A memory storage device, comprising:

a connector, coupled to a host system;

a rewritable non-volatile memory module, comprising a plurality of physical unit groups, wherein each of the physical unit groups comprises a plurality of physical unit sets, each of the physical unit sets comprises a plurality of physical units, and the physical units in each of the physical unit sets at least comprise a first physical unit; and a memory controller, coupled to the connector and the rewritable non-volatile memory module, wherein the memory controller is configured to group the physical unit groups into at least a first area and a second area, set the physical unit groups of the first area in a first program mode, and set the physical unit groups of the second area in a second program mode, wherein the first program mode indicates that all of the physical units are programmable, and the second program mode indicates that only the first physical units are programmable, wherein when a first physical unit group in the second area satisfies a second damage condition, the memory controller is configured to use a second physical unit group of the first area to replace the first physical unit group, and set the second physical unit group in the second program mode, wherein the second physical unit group is unable to be set back in the first program mode.

9. The memory storage device as claimed in claim 8, wherein the second damage condition comprises: an erase count of the first physical unit group reaches a second threshold value, the first physical unit group occurs a program fail, or the number of error bits in the first physical unit group exceeds an upper limit capable of being corrected by an error checking and correcting code.

10. The memory storage device as claimed in claim 9, wherein the memory controller is further configured to obtain the second physical unit group satisfying a first damage condition from the physical unit groups of the first area to replace the first physical unit group, wherein the first damage condition comprises: an erase count of the second physical unit group reaches a first threshold value, the second physical unit group occurs a program fail, or the number of error bits in the second physical unit group exceeds an upper limit capable of being corrected by an error checking and correcting code.

11. The memory storage device as claimed in claim 8, wherein the memory controller is further configured to obtain the second physical unit group with an erase count between zero and a first threshold value from the physical unit groups of the first area to replace the first physical unit group.

12. The memory storage device as claimed in claim 8, wherein when a third physical unit group of the first area satisfies a first damage condition, the memory controller is further configured to group the third physical unit group to the second area, and set the third physical unit group in the second program mode, wherein the third physical unit group is unable to be set back in the first program mode, and the first damage condition comprises: an erase count of the third physical unit group reaches a first threshold value, the third physical unit group occurs a program fail, or the number of error bits in the third physical unit group exceeds an upper limit capable of being corrected by an error checking and correcting code.

13. The memory storage device as claimed in claim 8, wherein when a third physical unit group of the first area satisfies a first damage condition, the memory controller is further configured to obtain a plurality of fourth physical unit groups in the first area that satisfy the first damage condition, set the fourth physical unit groups in the second program mode, and uses the fourth physical unit groups to replace the third physical unit group, wherein the first damage condition comprises: an erase count of the fourth physical unit groups reach a first threshold value, the fourth physical unit groups occur a program fail, or the number of error bits in the fourth physical unit groups exceeds an upper limit capable of being corrected by an error checking and correcting code.

14. The memory storage device as claimed in claim 8, wherein the memory controller is further configured to determine whether the first area has a physical unit group that is capable of storing data under the first program mode, and if not, the memory controller obtains the fourth physical unit groups to replace the third physical unit group.

15. A memory controller, comprising:

a host interface, coupled to a host system;

a memory interface, coupled to a rewritable non-volatile memory module, wherein the rewritable non-volatile memory module comprises a plurality of physical unit groups, each of the physical unit groups comprises a plurality of physical unit sets, each of the physical unit sets comprises a plurality of physical units, and the physical units in each of the physical unit sets at least comprise a first physical unit; and a memory management circuit, coupled to the host interface and the memory interface, wherein the memory management circuit is configured to group the physical unit groups into at least a first area and a second area, set the physical unit groups of the first area in a first program mode, and set the physical unit groups of the second area in a second program mode, wherein the first program mode indicates that all of the physical units are programmable, and the second program mode indicates that only the first physical units are programmable, wherein when a first physical unit group in the second area satisfies a second damage condition, the memory management circuit is configured to use a second physical unit group of the first area to replace the first physical unit group, and set the second physical unit group in the second program mode, wherein the second physical unit group is unable to be set back in the first program mode.

16. The memory controller as claimed in claim 15, wherein the second damage condition comprises: an erase count of the first physical unit group reaches a second threshold value, the first physical unit group occurs a program fail, or the number of error bits in the first physical unit group exceeds an upper limit capable of being corrected by an error checking and correcting code.

17. The memory controller as claimed in claim 16, wherein the memory management circuit is further configured to obtain the second physical unit group satisfying a first damage condition from the physical unit groups of the first area to replace the first physical unit group, wherein the first damage condition comprises: an erase count of the second physical unit group reaches a first threshold value, the second physical unit group occurs a program fail, or the number of error bits in the second physical unit group exceeds an upper limit capable of being corrected by an error checking and correcting code.

18. The memory controller as claimed in claim 16, wherein the memory management circuit further obtains the second physical unit group with an erase count between zero and a first threshold value from the physical unit groups of the first area to replace the first physical unit group.

19. The memory controller as claimed in claim 15, wherein when a third physical unit group of the first area satisfies a first damage condition, the memory management circuit is further configured to group the third physical unit group to the second area, and set the third physical unit group in the second program mode, wherein the third physical unit group is unable to be set back in the first program mode, and the first damage condition comprises: an erase count of the third physical unit group reaches a first threshold value, the third physical unit group occurs a program fail, or the number of error bits in the third physical unit group exceeds an upper limit capable of being corrected by an error checking and correcting code.

20. The memory controller as claimed in claim 15, wherein when a third physical unit group of the first area satisfies a first damage condition, the memory management circuit is further configured to obtain a plurality of fourth physical unit groups in the first area that satisfy the first damage condition, set the fourth physical unit groups in the second program mode, and use the fourth physical unit groups to replace the third physical unit group, wherein the first damage condition comprises: an erase count of the fourth physical unit groups reach a first threshold value, the fourth physical unit groups occur a program fail, or the number of error bits in the fourth physical unit groups exceeds an upper limit capable of being corrected by an error checking and correcting code.

21. The memory controller as claimed in claim 20, wherein the memory management circuit is further configured to determine whether the first area has a physical unit group that is capable of storing data under the first program mode, and if not, the memory management circuit obtains the fourth physical unit groups to replace the third physical unit group.

22. A memory management method, for a rewritable non-volatile memory module, wherein the rewritable non-volatile memory module comprises a plurality of physical unit groups, each of the physical unit groups comprises a plurality of physical unit sets, each of the physical unit sets comprises a plurality of physical units, and the physical units in each of the physical unit sets at least comprise a first physical unit, the memory management method comprising:

grouping the physical unit groups into at least a first area and a second area, setting the physical unit groups of the first area in a first program mode and setting the physical unit groups of the second area in a second program mode, wherein the first program mode indicates that all of the physical units are programmable, and the second program mode indicates that only the first physical units are programmable; and when at least one first physical unit group in the first area satisfies a first damage condition, grouping the at least one first physical unit group to the second area and setting the at least one first physical unit group in the second program mode, wherein the at least one first physical unit group is unable to be set back in the first program mode.

23. The memory management method as claimed in claim 22, wherein the first damage condition comprises: an erase count of the at least one first physical unit group reaches a first threshold value, the at least one first physical unit group occurs a program fail, or the number of error bits in the at least one first physical unit group exceeds an upper limit capable of being corrected by an error checking and correcting code.

24. The memory management method as claimed in claim 23, further comprising:

dividing the first area into a data area and a third area, and configuring a plurality of logical unit groups for mapping to the physical unit groups of the data area;

when the at least one first physical unit group satisfies the first damage condition, determining whether the third area has a physical unit group that is capable of storing data under the first program mode, and if not, obtaining a plurality of second physical unit groups from the second area; and grouping the second physical unit groups to the third area.

* * * * *